United States Patent [19]

Biedell et al.

[11] 4,351,804

[45] Sep. 28, 1982

[54] SULFUR DIOXIDE SCRUBBER WITH HYDROCLONE SEPARATOR

[75] Inventors: Edward L. Biedell, Scotch Plains; Robert J. Ferb, Warren, both of N.J.

[73] Assignee: Research-Cottrell, Inc., Somerville, N.J.

[21] Appl. No.: 138,415

[22] Filed: Apr. 8, 1980

Related U.S. Application Data

[62] Division of Ser. No. 957,674, Nov. 6, 1978, Pat. No. 4,250,152.

[51] Int. Cl.³ .................... B01D 53/14; B01D 53/34; B01J 19/04
[52] U.S. Cl. .................................... 422/170; 422/234
[58] Field of Search .......... 423/242 A, 242 R, 512 A, 423/166, 555; 422/169, 170, 234

[56] References Cited

U.S. PATENT DOCUMENTS

| | | |
|---|---|---|
| 3,735,869 | 5/1973 | Carpenter et al. |
| 3,773,472 | 11/1973 | Hausberg et al. ................. 422/169 |
| 3,788,469 | 1/1974 | Hirsch et al. |
| 3,903,243 | 9/1975 | Atsukawa et al. .................. 423/166 |
| 3,928,186 | 12/1975 | Zemanek . |
| 3,989,464 | 11/1976 | Dahlstrom et al. ................ 422/170 |
| 3,989,465 | 11/1976 | Onnen .............................. 422/170 |
| 3,995,006 | 11/1976 | Downs ............................ 423/512 A |
| 4,198,388 | 4/1980 | Laslo et al. ..................... 422/170 |

*Primary Examiner*—Bradley Garris
*Attorney, Agent, or Firm*—Kerkam, Stowell, Kondracki & Clarke

[57] ABSTRACT

Sulfur dioxide is scrubbed from boiler flue gases in a double-loop alkali scrubber, one a quencher loop and the other an absorption loop. Preferably, the reagent flow of the two loops is isolated so that none of the reagent from the quencher loop is cycled to the absorber loop. A substantial portion of the make-up water for the quencher loop is received from the absorber loop and solids are concentrated in a dewatering system which includes a hydroclone.

1 Claim, 4 Drawing Figures

SULFUR DIOXIDE SCRUBBER WITH HYDROCLONE SEPARATOR

This is a Division; of Application Ser. No. 957,674 filed Nov. 6, 1978 now U.S. Pat. No. 4,250,152 granted Feb. 10, 1981.

BACKGROUND OF THE INVENTION

1. Field of the Invention

This invention is directed to a unique doubleloop $SO_2$ scrubbing system for flue gas desulfurization which achieves substantially complete lime or limestone utilization concurrently with high $SO_2$ scrubbing efficiency, and excellent corrosion control.

2. Description of the Prior Art

Scrubbing of boiler flue gases with slurries of limestone ($CaCO_3$) or calcined limestone products, lime and hydrated lime, is a known and simple method for the removal of sulfur dioxide ($SO_2$) from these combustion gases. The system does, however, require makeup water for operation and therefore increases the total plant demand for water. As suitable quality water is often available to the plant only in limited quantities, it is essential that the scrubbing system use a minimum of high quality makeup water.

Makeup water is required in sulfur dioxide scrubbing systems to replace water lost in two areas: (1) water lost through evaporation as a means of saturating the incoming gases; and (2) water lost with the solid waste product composed of unreacted reagent, calcium sulfite hydrates and calcium sulfate hydrites that are discharged from the system. The total makeup water requirements for the system can, therefore, be minimized by reducing these water losses.

Generally makeup water enters the sulfur dioxide scrubbing system in several areas: (1) water entering with the reagent; (2) water for slurry pump packing glands; (3) wash water to remove solids that have built up on impingement-type demisters; (4) quencher makeup water, which replaces most of the evaporative losses. Most of the makeup water is either demister wash water or quencher makeup water. The water used as demister wash water must be of sufficiently high quality so as not to contribute to the solids build-up it is designated to wash away. Its solids content and pH must be kept within limits. The quencher makeup water, on the other hand, can be of considerably lesser quality.

One prior art method for minimizing system water losses (i.e. process makeup water requirements) is to operate the scrubbing system in a closed loop manner. In closed loop operation, the discharge slurry from the scrubbing system is partially dewatered to generate two new streams; a high solids stream that is sent to disposal; and a low quality water stream that is recycled to the scrubbing system.

Utilization of this recycled water can reduce the overall process fresh makeup water requirements by up to 50%. However, the recycled water is saturated in sulfates which increases the potential for scaling in the flue gas desulfurization system. In addition, impurities including corrosive chlorides are concentrated within the $SO_2$ Removal System during closed loop operation. These impurities force the use of exotic and expensive materials of construction and often preclude closed loop operation in single loop desulfurization systems.

SUMMARY OF THE INVENTION

It is known that a solution to these problems is to operate the process in two loops, and to isolate the demisters, which cannot accept recycled water, from the evaporative portion of the process which requires quencher makeup water; then to send all of the recycled water back to the evaporative "quencher" loop and none to the loop containing the demisters and the primary absorber sections. The present invention adds to such system a unique system for selectively separating certain of the solids and the liquid from the quencher recycle water.

BRIEF DESCRIPTION OF THE DRAWINGS

The invention will be more particularly described in reference to the drawings wherein.

DESCRIPTION OF THE PREFERRED EMBODIMENTS

Figure 1:
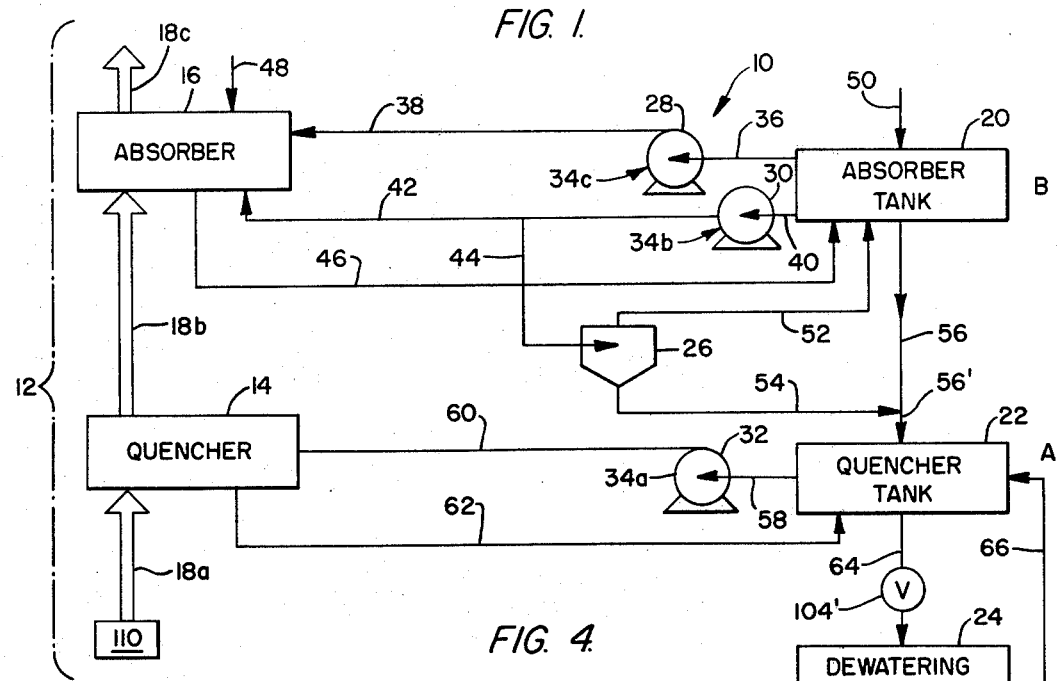
FIG. 1 is a simplified flow diagram of the system.
Figure 2:
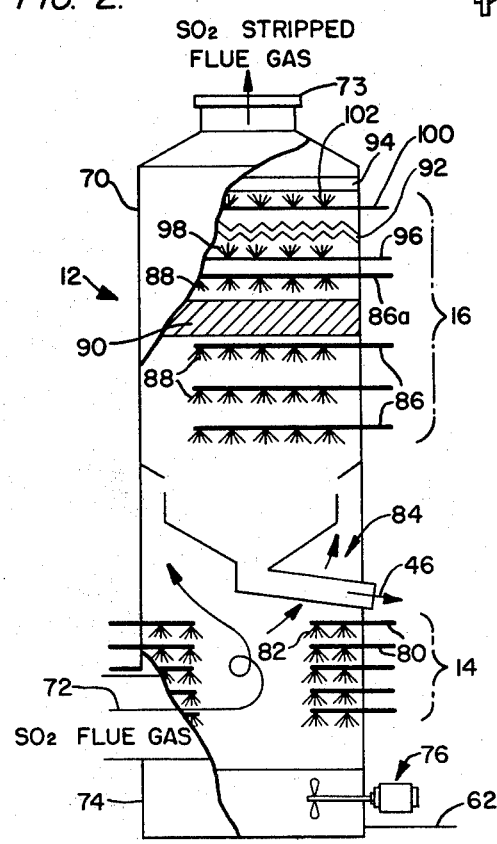
FIG. 2 is a partial sectional diagrammatic view of a multi-stage quencher-absorber tower useful for carrying out the system of the invention.

Referring to FIG. 1 of the drawings, 10 generally designates a system of the invention and the system includes a multiple-stage quencher-absorber tower 12, to be more fully described in reference to FIG. 2, which includes a quencher 14 and an absorber 16.

Arrows 18a, b and c designate respectively the gas flow to the quencher 14, gas flow from the quencher 14 to the absorber and the $SO_2$ stripped flue gas.

Figure 4:
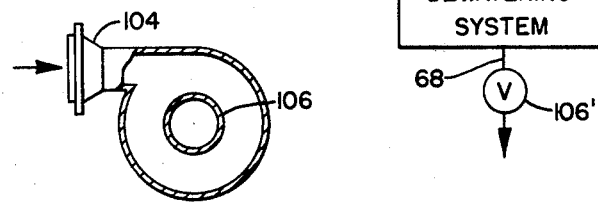
FIG. 4 is a section on line 4—4 of FIG. 3.
Figure 3:
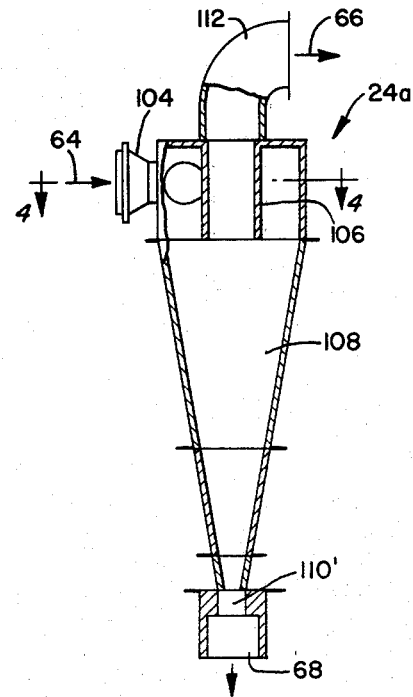
FIG. 3 is an enlarged partial sectional view of a hydroclone useful in the system of the invention.

Other primary components of the system include absorber tank 20, quencher tank 22, dewatering system 24 comprising a hydroclone 24a illustrated in FIGS. 3 and 4, an absorber separator 26, pumps 28, 30 and 32, each of which has a pump seal water inlet designated 34a, b and c for pumps 32, 30 and 28 respectively.

The primary liquids/slurry lines for the system are: line 36 from the absorber tank 20 to pump 28; line 38 comprising the primary absorber feed line from the pump 28 to the absorber 16; secondary absorber feed line 40 from absorber tank 20 to pump 38; secondary absorber feed line 42 from pump 30 to absorber 16; line 44 comprising a branch of line 42 from the secondary absorber feed to the absorber separator 26; line 46 from the absorber 16 to the absorber tank 20, the demister wash water line 48 for the multi-stage quencher-absorber tower 12; line 50 the reagent feed line for absorber tank 20; overflow line 52 from the absorber separator 26 to absorber tank 20; underflow line 54 from the absorber separator 26; absorber tank 20 overflow line; the quencher tank feed line 56; line 58 from quencher tank 22 to pump 32; line 60 comprising the quencher feed line from pump 32 to the quencher 14; quencher return line 62 from quencher 14 to quencher tank 22; line 64 comprising the discharge from the quencher tank 22 to the dewatering system 24; line 66 from the dewatering system 24 to the quencher tank 22; and line 68 comprising the dewatering system blow down line from dewaterer 24.

Referring now to FIG. 2, the multi-stage quencher-absorber tower 12 has a vertically extending shell 70 with a flue gas inlet 72 adjacent to the lower end and a $SO_2$ stripped flue gas outlet 73 at the upper end. Below the flue gas inlet 72 is a sump 74 provided with a sump stirring mechanism generally designated 76. From the sump is connected line 62, the return line from the quencher to the quencher tank 22.

In FIG. 2, the quencher section is generally designated 14 and the absorber section is generally designated 16. The quencher section includes a plurality of headers 80, which would be connected to line 60 from the pump 32, with each of the headers being provided with a plurality of spray outlet nozzles 82. In a preferred embodiment, the quencher section 14 is of the cyclonic type as the flue gases entering inlet 72 are caused to flow tangentially upwardly.

Between the quencher section 14 and the absorber section 16 is a gas/liquid bowl separator generally designated 84. This separator 84 collects the water from the demister and the treating fluid from the absorber and the collected fluid is directed from the separator 84, for return to the absorber tank, via line 46. Above the bowl separator 84 are a plurality of headers designated 86 and 86a each having connection to lines 42 and 38 comprising the primary and secondary absorber feed lines.

Each of the headers 86 and 86a is provided with a plurality of spray type outlet nozzles 88 and between the headers 86 and 86a is a conventional packed tower arrangement 90. Above the upper most header 86a is arranged lower demister 92 and upper demister 94. Wash water for the lower demister is provided via header 96 having spray type outlets 98. The upper demister 94 is also provided with a wash liquid means including a header 100 provided with spray type outlets 102.

Referring now to FIGS. 3 and 4, the hydroclone 24a is provided with a tangential inlet 104, which is fed the slurry to be dewatered via line 64. The fluid entering the hydroclone 24a via the tangential inlet 104 swirls about a vortex finder 106. The swirling slurry concentrates flow down the cone section 108 to the apex opening 110 thence out the underflow via line 68. The partially clarified slurry passes upwardly through the vortex finder 106 to the outlet 112 then to conduit 66 for return to the quencher tank 22. Lines 64 and 68 are provided with hydroclone control valves 104' and 106'.

The centrifugal separation forces of the hydroclone were found to very effectively selectively concentrate calcium sulfate in the underflow while the overflow recycles the remaining slurry constituents back into the main quencher feed systems. The effectiveness of the hydroclone assures virtually complete lime utilization in the flue gas desulfurization process all as to be more fully described hereinafter.

Referring again to the drawings of the present invention, the two-loop process includes a quencher loop A wherein almost all of the evaporative water losses occur, and an absorber loop B (which includes the demisters 92-94), wherein gases pass first through the quencher loop, then through the absorber loop. Reagent flow is counter-current to the gas flow, passing first through the absorber loop. Solids are removed from the system as follows: Solids products of the reaction between the calcium based reagent and sulfur dioxide, as well as some unreacted reagent, are fed from the absorber loop B to the quencher along A with some water. The solids are then circulated through the quencher loop A wherein more reaction products are formed as the concentration of unreacted reagent decreases. The solids are then discharged from the quencher to the dewatering system 24 and ultimate waste disposal.

Makeup water enters the absorber loop as: (1) water entering with the reagent at 50; (2) water for slurry pump packing glands at 34a and b; and (3) demister wash water at 48. Makeup water enters the quencher loop as: (1) fresh makeup water for slurry pump packing glands at 34a; (2) quencher makeup water (recycled water) at 66, which replaces most of the evaporative losses; and (3) water accompanying the absorber loop discharge solids at 54.

If and when the process requirement for quencher makeup water is equal to the recycled water generated by the sludge dewatering systems, optimum water utilization is achieved. However, the process requirement for quencher makeup water is directly related to the volume of flue gas treated. The recycled water is generated (for a given mode of disposal solids dewatering) is directly related to both the volume of gas treated and the concentration of sulfur dioxide in the gas. Therefore, there is only one precise sulfur dioxide concentration for any given treated gas volume for which the process requirement for quencher makeup water equals the recycled water available for return to the process. As a result, there are many operating conditions when the recycled water that is available exceeds or is less than the quencher makeup water requirement.

For those operating conditions where the recycled water generated exceeds the quencher makeup water requirement, the water accompanying the absorber loop discharge solids must be reduced in order to permit all of the recycled water to enter the quencher loop. By doing this, no recycled water is sent to the absorber loop and in particular to the demister wash sprays, while maintaining closed loop operation.

For those operating conditions where the recycled water generated is less than the quencher makeup water requirement, it is desirable to increase the water accompanying the absorber loop discharge solids. The water used to increase this flow is added to the process as demister wash water, thereby achieving the goal of maximizing demister wash water relative to the total fresh makeup water requirement.

In both cases, it is desired to vary the amount of water exiting with the absorber loop discharge solids without affecting the operation of the absorber circuit. This is done through the use of solid/liquid separating hydroclone 24a. The hydroclone treats a portion of the absorber loop slurry to generate two streams, a high solids stream and a low solids stream. Either of these streams can be combined with an appropriate quantity of untreated absorber loop slurry to produce a stream containing solids equal to the rate of solids build-up in the absorber circuit along with any quantity of water attainable from the mixing of these two streams. With the approach, a wide range of solids contents is attainable in the absorber discharge stream.

For those operating conditions where the recycled water generated exceeds the quencher makeup water requirement, the high solids stream is combined with untreated absorber discharge slurry to reduce the total amount of water accompanying the absorber discharge solids. For those operating conditions where the recycled water generated is less than the quencher makeup water requirement, the low solids stream is combined with untreated absorber discharge slurry to increase the total amount of water accompanying the absorber discharge solids.

Because plant operating conditions (i.e. load factor and fuel sulfur content) are constantly varying, the rate of solids generation in the absorber circuit, and the amount of water required to enter the quencher circuit with those solids, are also constantly changing. To allow the solid/liquid separator system to react to the instantaneous process requirements for water versus solids in the absorber discharge slurry, a sulfur dioxide mass flow signal 110 is used. This signal is fed to a controller (not shown) which relates the volume of gas treated and the concentration of sulfur dioxide in the gas to the rate of recycled water generation as well as to the rate of absorber discharge solids generation and determines the ratio of treated absorber discharge slurry to untreated absorber discharge slurry. The controller also determines whether the high solids stream or the low solids stream should be mixed with the untreated absorber discharge slurry. Therefore, with this control scheme, the quencher circuit can receive the amount of water from the absorber circuit that it requires under all process operation conditions.

The primary advantage of using a hydroclone 24a is that the hydroclone accomplishes a chemical separation rather than a separation based strictly on particle size. The constituents in the feed stream via line 64 to the hydroclone 24a would normally include:

$CaSO_4.2H_2O$ Gypsum
$CaSO_3.\frac{1}{2} H_2O$
$CaCO_3$
$Ca(OH)_2$ in some cases
Gangue from the lime or limestone
Fly Ash Fines
Chips from scale deposits in the scrubber Test data indicate that by making appropriate adjustments in the hydroclone operating parameters, namely, the feed rates and under flow rates via valves 104' and 106' the chemical compositions of the underflow and overflow can be controlled. While it is true that the separation is determined by particle size and density differences, the essence of the invention is the ability to control the chemical composition of the underflow and overflow streams.

This ability to control the system's chemical constituents has several very important results. First, the separation can be controlled, when $Ca(OH)_2$ or finely ground limestone ($CaCO_3$) is used as the scrubbing reagent, to essentially eliminate the presence of $Ca(OH)_2$ or $CaCO_3$ in the hydroclone underflow, the system effluent. This will substantially increase the utilization factor for these reagents in the scrubbing process. The cost of these reagents makes up 10 to 30% of the normal operating expense of the systems and this invention can reduce their consumption by up to 20% thereby reducing the overall operating cost by as much as 6%. For a typical utility system this saving is approximately $1,000,000 per year.

Second, by utilizing a hydroclone in the system, via the ability to control the chemical compositions of the various streams, the hydroclone will maximize the gypsum content of the hydroclone underflow when an in situ oxidation system is being utilized or where naturally high sulfite oxidation occurs. This approach produces a waste product stream that possesses very desirable dewatering, blending and disposal properties. This can substantially reduce the investment and operating costs incurred for final sludge dewatering and disposal. In addition, it provides a means of recycling smaller gypsum crystals as well as unoxidized $CaSO_3.\frac{1}{2}H_2O$ to the system for further oxidation and crystal growth. This ability to remove the desirable gypsum selectively allows for a simpler oxidizer design since complete oxidation and maximum crystal size need not be obtained directly in the oxidation system.

The operation of the hydroclone in the system of the present invention will be more fully understood from the following examples. In the examples, the only control variables were the inlet pressure to the hydroclone (flow rate) and the ratio of overflow to underflow. These conditions were varied by throttling the two valves 104' and 106' located at the inlet and outlet of the hydroclone. A filter was placed on the bottom cone 68 of the hydroclone in four of the tests (runs 7 through 10, Table I) in an effort to produce higher % solids in the underflow.

A total of eleven runs were conducted. Flow rates for the overflow and underflow were measured during each run by using a calibrated bucket and stopwatch. The pressure drop across the hydroclone was taken and field analyses were run on overflow and underflow samples for pH and % solids. Other samples were filtered for analysis and determination of particle size distribution. The highest solids concentration attained in the underflow under reproducible conditions was 61.0% dry solids (87.6% solids was obtained in run #1, but could not be verified in a later duplicate test). Overflow concentrations appeared to be independent of process conditions, remaining close to an average value of 4.05% solids.

Filtered overflow and underflow samples from each run were submitted to the laboratory for thermogravimetric analysis (TGA) to determine the sulfate and sulfite concentrations, and for analysis to determine the percentage of acid insolubles and loss on ignition. A summary of the data is presented in Table II. The composition of the underflow sludge is of most interest and the sulfate ($CaSO_4.2H_2O$) concentration in the underflow was surprisingly high, varying slightly more than 5% around a mean of 95.93%. Acid insolubles averaged 3.8% in the underflow samples, indicating little or no sulfite or unreacted lime present. A check on total alkalinity of the high pH test samples confirmed this.

The overflow samples contained a substantial amount of fine unburned carbon, as indicated by the relatively high (25.96%) average loss on ignition. The overflow composition averaged out to 39.8% sulfate and 58.87% acid insolubles.

Particle size distribution of unfiltered samples was determined by wet sieve analysis. Almost 100% of the overflow particulate was finer than 44$\mu$, the smallest test sieve available. The underflow had a somewhat broader distribution, with up to 19% of the particulate in the 44 to 74$\mu$ range, although more than 80% was finer than 44$\mu$ in all cases.

The abundance of sulfate in the underflow is explainable based on the theory of operation of the hydroclone. The hydroclone uses centrifugal force to separate the smaller low density particles from the larger high density particles in the incoming sludge. Calcium sulfate is the largest particle present and separates more easily forming the majority of the underflow, while smaller particles form the bulk of the overflow.

The magnitude of the sulfate concentration in the underflow was unexpected. An average of almost 96% $CaSO_4.2H_2O$ for all runs regardless of feed concentration (normal maximum 70% sulfate) was observed. It was found that the sulfate concentration varies directly with the solids concentration of the underflow, with a maximum of 98% attainable, but with relatively little change above 55% solids.

The noted absence of unreacted lime in the underflow implies that the lime is being recycled back into the system with the hydroclone overflow. Laboratory analysis for total alkalinity in the underflow sludge from runs #9 and #11 confirmed the low lime content (0 to 1.29%) even at high slurry pH. This indicates that high lime utilization can be achieved at virtually any sulfur dioxide removal efficiency desired due to the efficient separation of the unreacted lime in the hydroclone. Also, the sludge thickening capability of the hydroclone appears to be independent of slurry pH.

The sulfate concentration and % solids in the hydroclone underflow sludge is a function of the ratio of the flow rates (overflow/underflow). The amount of overflow obtained was proportional to the pressure drop across the hydroclone.

| ASSUMPTIONS Cases 1 and 2 | | |
|---|---|---|
| (1) | Absorber Tower Efficiency = | 90% |
| | Quencher Efficiency = | 30% |
| | Absorber Efficiency = | 85.71% |
| (2) | Reagent Utilization = | 95% |
| (3) | Limestone Purity = | 95% |
| (4) | No fly ash absorbed into slurry streams | |
| (5) | Forced oxidation in quencher to 95% mole fraction $CaSO_4 \cdot 2H_2O$ | |
| (6) | 80% solids blowdown to ultimate disposal (fully closed loop) | |

CASE 1
High Sulfur (3,000 ppmw) case
Absorber feed to quencher = 25.33% solids
CASE 5
Medium Sulfur (1,500 ppmw) case
Absorber feed to quencher = 15.34% solids

TABLE I
HYDROCLONE PERFORMANCE TEST RESULTS

| Run No. | Flow Rate, GPM Overflow | Flow Rate, GPM Underflow | Ratio Overflow/Underflow | Pressure Drop Across Hydro-Clone, psi | % Solids Overflow | % Solids Underflow | pH |
|---|---|---|---|---|---|---|---|
| 1 | 15.36 | 3.35 | 4.58 | 24.0 | 4.9 | (87.6)[a] | — |
| 2 | 15.04 | 3.61 | 4.17 | 23.0 | 4.0 | 61.0 | — |
| 3 | 9.45 | 4.36 | 2.16 | 18.1 | 4.7 | 41.3 | 5.1 |
| 4 | 6.25 | 8.01 | 0.78 | 13.3 | 4.0 | 26.7 | 3.1 |
| 5 | 0.78 | 13.91 | 0.056 | 7.5 | 3.7 | 19.6 | 3.3 |
| 6 | 13.65 | 5.71 | 2.39 | 22.8 | 3.9 | 42.7 | 4.4 |
| 7 | 9.57 | 2.89 | 3.31 | .2 | 3.9 | 47.1 | 3.4 |
| 8 | 0.0[b] | 4.23 | 0.0 | 40.2 | — | 24.3 | 7.8 |
| 9 | 12.71 | 5.38 | 2.36 | 20.2 | 3.8 | 41.7 | 8.2 |
| 10 | 14.45 | 2.39 | 6.05 | 22.8 | 3.7 | 59.2 | |
| 11 | 11.52 | 5.46 | 2.11 | 23.2 | 3.9 | 31.6 | 7.1 |

[a] Result appears to be in error.
[b] The pressure head in this test was not high enough to pump any overflow up to the top of the dissolver tank (approx. 20 feet).

TABLE II
TGA RESULTS

| Run No. | % $CaSO_4 \cdot 2H_2O$ Overflow | % $CaSO_4 \cdot 2H_2O$ Underflow | % Acid Insolubles Overflow | % Acid Insolubles Underflow | % Loss On Ignition Overflow |
|---|---|---|---|---|---|
| 1 | 41.57 | 97.77 | 58.15 | 1.50 | 26.5 |
| 2 | 39.18 | 97.72 | 61.49 | 4.47 | 28.0 |
| 3 | 47.78 | 97.34 | 58.49 | 3.44 | 26.5 |
| 4 | 43.96 | 96.28 | 53.05 | 3.02 | 25.6 |
| 5 | 22.94 | 90.79 | 76.22 | 9.83 | 34.2 |
| 6 | 32.49 | 96.52 | 66.33 | 1.89 | 22.8 |
| 7 | 38.23 | 96.52 | 60.35 | 1.58 | 22.3 |
| 8 | — | 92.08 | — | 8.08 | — |
| 9 | 43.01 | 94.37 | 52.16 | 2.83 | 24.1 |
| 10 | 46.83 | 97.31 | 49.15 | 1.85 | 22.7 |
| 11 | 42.05 | 98.58 | 53.30 | 3.28 | 26.9 |
| Average | 39.80 | 95.93 | 58.87 | 3.80 | 25.96 |

The following examples, designated Case 1 and Case 2 for a high sulfur containing gas stream and a medium sulfur containing gas stream will further delineate the present invention.

| STREAMS CASES 1 and 2 | |
|---|---|
| 18a | GAS IN |
| 18b | GAS |
| 18c | GAS OUT |
| 50 | REAGENT FEED |
| 34c | PRIMARY ABSORBER PUMP SEAL WATER |
| 34b | SECONDARY ABSORBER PUMP SEAL WATER |
| 48 | DEMISTER WASH WATER |
| 38 | PRIMARY ABSORBER FEED |
| 42 | SECONDARY ABSORBER FEED |
| 44 | ABSORBER SEPARATOR FEED |
| 52 | ABSORBER SEPARATOR OVERFLOW |
| 54 | ABSORBER SEPARATOR UNDERFLOW |
| 56 | ABSORBER TANK OVERFLOW |
| 56' | SLURRY FEED TO QUENCHER FROM ABSORBER |
| 34a | QUENCHER PUMP SEAL WATER |
| 66 | DISPOSAL RETURN WATER |
| 60 | QUENCHER FEED |
| 64 | DISCHARGE TO DEWATERING SYSTEM |
| 68 | DEWATERING SYSTEM BLOWDOWN |
| EL | EVAPORATIVE LOSSES |

| GAS STREAMS CASE 1 GAS IN - 18a | | | | | |
|---|---|---|---|---|---|
| | lb/hr | lb moles/hr | ppm | | |
| $N_2$ | 1,207,421 | 43,122 | 767,000 | DENSITY | 0.0550 lb/ft$^3$ |

-continued

| | | | | | |
|---|---|---|---|---|---|
| CO$_2$ | 296,852 | 6,747 | 120,000 | TEMP | ° 280° F. |
| O$_2$ | 53,973 | 1,687 | 30,000 | PRESSURE | ° 8.0 IWC @ SEA LEVEL |
| SO$_2$ | 10,795 | 169 | 3,000 | MW | ° 29.348 LB/LB MOLE |
| H$_2$O | 80,959 | 4,497 | 80,000 | | |
| Total | 1,650,000 | 56,222 | 1,000,000 | ACFM | ° 500,00 |

GAS SATURATED - 18b

| | lb/hr | lb/moles/hr | ppm | | |
|---|---|---|---|---|---|
| N$_2$ | 1,207,421 | 43,122 | 730,447 | DENSITY | ° 0.0707 lb/ft$^3$ |
| CO$_2$ | 299,079 | 6,797 | 115,135 | TEMP | ° 125° F. |
| O$_2$ | 49,484 | 1,456 | 26,188 | PRESSURE | ° 5.0 IWC @ SEA LEVEL |
| SO$_2$ | 7,556.5 | 118.07 | 2,000 | MW | ° 28.757 LB/LB MOLE |
| H$_2$O | 134,144 | 7,452 | 126,230 | | |
| Total | 1,697,685 | 59,035 | 1,000,000 | ACFM | ° 400,000 |

GAS OUT - 18c

| | lb/hr | lb moles/hr | ppm | | |
|---|---|---|---|---|---|
| N$_2$ | 1,207,421 | 43,122 | 732,423 | DENSITY | ° 0.0701 lb/ft$^3$ |
| CO$_2$ | 303,532 | 6,898 | 117,161 | TEMP | ° 125° F. |
| O$_2$ | 44,379 | 1,387 | 23,558 | PRESSURE | ° 3.0 IWC @ SEA LEVEL |
| SO$_2$ | 1,709.5 | 16.87 | 287 | MW | ° 28.71 LB/LB MOLE |
| H$_2$O | 134,144 | 7,452 | 126,571 | | |
| Total | 1,690,556 | 58,876 | 1,000,000 | ACFM | ° 401,951 |

LIQUID STREAMS CASE 1

| Stream Number | lb/hr CaCO$_3$ | lb/hr CaSO$_3$.½H$_2$O | lb/hr CaSO$_4$.2H$_2$O | lb/hr Inerts | lb/hr Water | lb/hr Total | GPM Total | % Solids | ppm CHlorides |
|---|---|---|---|---|---|---|---|---|---|
| 50 | 15,980 | 0 | 0 | 841 | 31,239 | 48,060 | 76 | 35 | 1,000 |
| 34c | 0 | 0 | 0 | 0 | 5,000 | 5,000 | 10 | 0 | 1,000 |
| 34b | 0 | 0 | 0 | 0 | 2,500 | 2,500 | 5 | 0 | 1,000 |
| 48 | 0 | 0 | 0 | 0 | 22,812 | 22,812 | 45 | 0 | 1,000 |
| 38 | 273,759 | 505,427 | 135,525 | 39,289 | 3,586,000 | 9,540,000 | 18,000 | 10 | 1,023 |
| 42 | 114,066 | 210,595 | 56,469 | 16,370 | 3,577,500 | 3,975,000 | 7,500 | 10 | 1,023 |
| 44 | 8,276 | 15,279 | 4,097 | 1,188 | 259,560 | 288,100 | 544 | 10 | 1,023 |
| 52 | 3,547 | 6,548 | 1,756 | 509 | 234,840 | 247,200 | 480 | 5 | 1,023 |
| 54 | 4,729 | 8,731 | 2,341 | 679 | 24,720 | 41,200 | 64 | 40 | 1,023 |
| 56 | 1,131 | 2,088 | 560 | 162 | 35,469 | 39,410 | 72 | 10 | 1,023 |
| 56' | 5,860 | 10,819 | 2,901 | 841 | 60,189 | 80,610 | 136 | 25.33 | 1,023 |
| 34a | 0 | 0 | 0 | 0 | 3,750 | 3,750 | 7.5 | 0 | 9,525 |
| 66 | 0 | 0 | 0 | 0 | 148,547 | 148,547 | 297 | 0 | 9,525 |
| 60 | 23,818 | 29,184 | 739,429 | 25,069 | 4,632,500 | 5,450,000 | 10,000 | 15 | 9,525 |
| 64 | 799 | 979 | 24,805 | 841 | 155,403 | 182,827 | 335 | 15 | 9,525 |
| 68 | 799 | 979 | 24,805 | 841 | 6,856 | 34,280 | 38 | 80 | 9,525 |
| EL | 0 | 0 | 0 | 0 | 53,185 | 53,185 | 106 | 0 | 0 |

GAS STREAMS CASE 2
GAS IN - 18a

| | lb/hr | lb moles/hr | ppm | | |
|---|---|---|---|---|---|
| N$_2$ | 1,202,656 | 42,952 | 767,000 | DENSITY | ° .0547 lb/ft$^3$ |
| CO$^2$ | 295,680 | 6,720 | 120,000 | TEMP | ° 280° F. |
| O$_2$ | 53,760 | 1,680 | 30,000 | PRESSURE | ° 8.0 IWC @ SEA LEVEL |
| SO$_2$ | 5,376 | 84 | 1,500 | MW | ° 29.279 lb lb/mole |
| H$_2$O | 82,152 | 4,564 | 81,500 | | |
| Total | 1,639,624 | 56,000 | 1,000,000 | ACFM | ° 500,000 |

GAS SATURATED - 18b

| | lb/hr | lb moles/hr | ppm | | |
|---|---|---|---|---|---|
| N$_2$ | 1,202,656 | 42,952 | 728,460 | DENSITY | ° .0705 lb/ft$^3$ |
| CO$_2$ | 296,789 | 6,745 | 114,394 | TEMP | ° 125° F. |
| O$_2$ | 52,655 | 1,645 | 27,899 | PRESSURE | ° 5.0 IWC @ SEA LEVEL |
| SO$_2$ | 3,763.2 | 58.8 | 997 | MW | ° 28.696 lb lb/mole |
| H$_2$O | 136,120 | 7,562 | 128,250 | | |
| Total | 1,691,983 | 58,963 | 1,000,000 | ACFM | ° 400,000 |

-continued

| | lb/hr | lb moles/hr | GAS OUT - 18c ppm | | | |
|---|---|---|---|---|---|---|
| $N_2$ | 1,202,656 | 42,952 | 728,499 | DENSITY | ° | .0701 |
| $CO_2$ | 299,007 | 6,796 | 115,267 | TEMP | ° | 125° F. |
| $O_2$ | 52,521 | 1,641 | 27,833 | PRESSURE | ° | 3.0 IWC @ SEA LEVEL |
| $SO_2$ | 537.6 | 8.4 | 142 | MW | ° | 28.618 lb/mole |
| $H_2O$ | 136,120 | 7,562 | 128,259 | | | |
| Total | 1,690,842 | 58,959 | 1,000,000 | ACFM | ° | 401,951 |

LIQUID STREAMS CASE 2

| Stream Number | lb/hr $CaCO_3$ | lb/hr $CaSO_3.\frac{1}{2}H_2O$ | lb/hr $CaSO_4.2H_2O$ | lb/hr Inerts | lb/hr Water | lb/hr Total | GPM Total | % Solids | ppm Chlorides |
|---|---|---|---|---|---|---|---|---|---|
| 50 | 7,958 | 0 | 0 | 419 | 15,557 | 23,934 | 38 | 35 | 1,000 |
| 34c | 0 | 0 | 0 | 0 | 5,000 | 5,000 | 10 | 0 | 1,000 |
| 34b | 0 | 0 | 0 | 0 | 2,500 | 2,500 | 5 | 0 | 1,000 |
| 48 | 0 | 0 | 0 | 0 | 33,767 | 33,767 | 67 | 0 | 1,000 |
| 38 | 243,310 | 449,265 | 120,488 | 34,937 | 7,632,000 | 8,480,000 | 16,000 | 10 | 1,012 |
| 42 | 60,828 | 112,316 | 30,122 | 8,734 | 1,908,000 | 2,120,000 | 4,000 | 10 | 1,012 |
| 44 | 2,370 | 4,376 | 1,174 | 340 | 74,340 | 82,600 | 156 | 10 | 1,012 |
| 52 | 1,016 | 1,876 | 503 | 140 | 67,263 | 70,805 | 138 | 5 | 1,012 |
| 54 | 1,354 | 2,500 | 671 | 194 | 7,077 | 11,795 | 18 | 40 | 1,012 |
| 56 | 1,564 | 2,888 | 774 | 235 | 49,069 | 54,521 | 103 | 10 | 1,012 |
| 56' | 2,918 | 5,388 | 1,445 | 419 | 56,146 | 66,316 | 121 | 15.34 | 1,012 |
| 34a | 0 | 0 | 0 | 0 | 2,500 | 2,500 | 5 | 0 | 1,000 |
| 66 | 0 | 0 | 0 | 0 | 73,980 | 73,980 | 148 | 0 | 16,640 |
| 60 | 19,058 | 23,367 | 591,512 | 20,063 | 3,706,000 | 4,360,000 | 8,000 | 15 | 16,640 |
| 64 | 398 | 488 | 12,353 | 419 | 77,395 | 91,053 | 167 | 15 | 16,640 |
| 68 | 398 | 488 | 12,353 | 419 | 3,415 | 17,073 | 19 | 80 | 16,640 |
| EL | 0 | 0 | 0 | 0 | 53,958 | 53,968 | 108 | 0 | 0 |

| Ranges of Stream Solids Contents | | | | |
|---|---|---|---|---|
| Stream Number | 52 | 54 | 56 | 56' |
| Stream Name | ABSORBER SEPARATOR OVERFLOW | ABSORBER SEPARATOR UNDERFLOW | ABSORBER TANK OVERFLOW | SLURRY FEED TO QUENCHER FROM ABSORBER |
| Range of % Solids | 3-10 | 10-50 | 5-15 | 3-50 |
| Hi Sulfur % Solids (Case 1) | 5 | 40 | 10 | 25.33 |
| Medium Sulfur % Solids (Case 2) | 5 | 40 | 10 | 15.34 |

We claim:

1. Apparatus for removing sulfur dioxide from flue gas comprising:
a quencher-absorber tower;
a flue gas quencher; and
a flue gas scrubber serially mounted in said tower;
a flue gas inlet for said tower in communication with said flue gas quencher;
gas outlet means for said tower in communication with the flue gas scrubber;
means for serially passing the flue gas first through the quencher and then through the scrubber;
an alkali reagent water slurry;
means for serially contacting the gas first in the quencher and then in the scrubber with the alkali/water slurry;
dewatering means for a portion of the partially spent alkali reagent water slurry;
said dewatering means comprising a hydroclone, a tangential inlet at the upper end of the hydroclone, a bottom outlet for discharging heavy particles from the hydroclone, a vortex finder mounted in the upper end of the hydroclone forming the light fraction discharge from the hydroclone, a slurry feed control valve for the tangential inlet, a heavy particle control valve for the bottom outlet and means for directing the lighter fraction discharged from the hydroclone into the alkali/water slurry for the gas quencher.

* * * * *